United States Patent
Carter

(10) Patent No.: US 7,162,507 B2
(45) Date of Patent: Jan. 9, 2007

(54) WIRELESS NETWORK SITE SURVEY TOOL

(75) Inventor: Trent R. Carter, Palm Bay, FL (US)

(73) Assignee: Conexant, Inc., Red Bank, NJ (US)

(*) Notice: Subject to any disclaimer, the term of this patent is extended or adjusted under 35 U.S.C. 154(b) by 773 days.

(21) Appl. No.: 09/922,084

(22) Filed: Aug. 3, 2001

(65) Prior Publication Data

US 2002/0129138 A1 Sep. 12, 2002

Related U.S. Application Data

(60) Provisional application No. 60/274,324, filed on Mar. 8, 2001.

(51) Int. Cl.
*G06F 15/16* (2006.01)
(52) U.S. Cl. .............. 709/200; 709/217; 709/224; 370/229; 370/241; 370/245; 370/338
(58) Field of Classification Search ........ 709/203–207, 709/219, 223–226, 232, 238–244, 200, 217; 455/446; 370/229, 241, 245, 338
See application file for complete search history.

(56) References Cited

U.S. PATENT DOCUMENTS

| | | | |
|---|---|---|---|
| 5,425,076 A | 6/1995 | Knippelmier | |
| 5,768,531 A | 6/1998 | Lin | |
| 6,157,838 A * | 12/2000 | Di Huo et al. | 455/439 |
| 6,178,512 B1 | 1/2001 | Fifield | |
| 6,269,395 B1 * | 7/2001 | Blatherwick et al. | 709/219 |
| 6,317,599 B1 * | 11/2001 | Rappaport et al. | 455/446 |
| 6,442,507 B1 * | 8/2002 | Skidmore et al. | 702/186 |
| 6,480,497 B1 * | 11/2002 | Flammer et al. | 370/400 |
| 6,920,319 B1 * | 7/2005 | Knutsson et al. | 455/422.1 |

(Continued)

FOREIGN PATENT DOCUMENTS

WO    WO 01/80498    10/2001

OTHER PUBLICATIONS

IBM , "Method for Easier, Better, and Faster Site Surveys for Wireless Networks", IBM Technical Disclosure Bulletin, IBM Corp. New York, US, vol. 40 No. 1, pp. 201-205, Jan. 1997.

(Continued)

*Primary Examiner*—Saleh Najjar
*Assistant Examiner*—Asad M. Nawaz
(74) *Attorney, Agent, or Firm*—Thomas, Kayden, Horstemeyer & Risley

(57) ABSTRACT

A tool for providing a site survey of a wireless network. In one embodiment the tool includes a network server, a plurality of access points and a mobile client. The network server is used to create and distribute data packets. The plurality of access points are coupled to send and receive data packets from the server. The mobile client is in wireless communication with the plurality of access points. The client has a two-dimensional surface area map on a data grid. The client includes instruction to compute throughput and packet error rate at selected locations within a network coverage area when the client receives data packets sent by the network server. The client displays the throughput and packet error rate on the two-dimensional surface area map to provide a site survey of the wireless network coverage.

47 Claims, 7 Drawing Sheets

U.S. PATENT DOCUMENTS

| | | |
|---|---|---|
| 6,990,428 B1 * | 1/2006 | Kaiser et al. ............... 702/150 |
| 7,002,943 B1 * | 2/2006 | Bhagwat et al. ............ 370/338 |
| 7,020,082 B1 * | 3/2006 | Bhagavath et al. ......... 370/230 |
| 7,085,588 B1 * | 8/2006 | Pfister et al. ............... 455/446 |
| 2002/0006799 A1 * | 1/2002 | Rappaport et al. .......... 455/446 |
| 2003/0135762 A1 * | 7/2003 | Macaulay ................... 713/201 |

OTHER PUBLICATIONS

Rohde and Schwartz, "Portable Coverage Measurement System TS9951- for GSM900/IS00/1900, ETACS/DECT/DAB/CDMA signaling parameters", <URL:http://rohde-schwarz.com/homepage, pp. 1-6, Oct. 1998.

* cited by examiner

WIRELESS NETWORK SITE SURVEY TOOL

RELATED APPLICATION

This application is related to and claims the benefit of the filing date of U.S. Provisional Application No. 60/274,324 filed Mar. 8, 2001 for: Wireless Network Site Survey Tool.

TECHNICAL FIELD

The present invention relates generally to the field of computer networks. More specifically, the present invention relates to wireless local area networks.

BACKGROUND

Local area networks (LANs) allow a plurality of computers to communicate with each other. A wireless LAN is one type of LAN. A wireless LAN allows computers to communicate with each without wires. An advantage of a wireless LAN is that is allows computers to be moved within a physical area ("service area") without regard to physical connections. Common wireless transmission medians used in wireless LAN networks include infrared light and radio wave propagation. One type of wireless LAN system uses an IEEE 802.11 technology standard protocol to communicate within the network. Other common protocols used on wireless LAN systems include BLUE TOOTH, HOME RF WIDEBAND, IEEE 802.11b and IEEE 802.11a.

Conventional wireless LAN systems typically use "access points." An access point is a device that acts as a transmitter and a receiver. Each access point is coupled to interface with an "infrastructure" network such as an Ethernet network. In a wireless LAN, computers or stations communicate with the access point via the wireless transmission median. That is, messages generated by the computers are sent to an associated access point and messages received by the computers are transmitted through an associated access point. For the system to work properly, computers must be placed within a certain distance from its associated access point to allow for transmission and reception of signals. Therefore, proper placement of the access points is paramount. According to current practice, access points are placed using a signal strength meter. This often results in the use of more access points than is necessary.

For the reasons stated above, and for other reasons stated below which will become apparent to those skilled in the art upon reading and understanding the present specification, there is a need in the art for improvements in placing access points in a wireless LAN.

SUMMARY

The above-mentioned problems and other problems are addressed by the present invention and will be understood by reading and studying the following specification. In one embodiment, a tool for providing a site survey of a wireless network is disclosed. The tool comprises a network server, a plurality of access points and a portable computer. The network server has a server application module to create and distribute data packets. The plurality of access points are coupled to send and receive data packets from the server. The portable computer is in wireless communication with the plurality of access points and has a two-dimensional surface area map on a data grid. The portable computer receives the data packets sent by the network server. Moreover, the portable computer includes instructions that are adapted to compute at least one of throughput and packet error rate at selected locations within a network coverage area and display the at least one of throughput and packet error rate on the two-dimensional surface area map to provide a site survey of the wireless network coverage.

In another embodiment, a tool for providing a site survey of a wireless network includes a network server, a plurality of access points and a mobile client. The network server is used to create and distribute data packets. The plurality of access points are coupled to send and receive data packets from the server. The mobile client is in wireless communication with the plurality of access points. The client has a two-dimensional surface area map on a data grid. The client includes instruction that are adapted to compute at least one of throughput and packet error rate at selected locations within a network coverage area when the client receives data packets sent by the network server. The client displays the at least one of throughput and packet error rate on the two-dimensional surface area map to provide a site survey of the wireless network coverage.

A method of providing a site survey of a wireless network comprising, sending data packets through the wireless network, collecting data on the data packet transmission, calculating throughput and error rate and implementing the throughput and error rate into a two-dimensional vector surface area map to convey a graphical representation of the wireless network coverage.

Another method of providing a site survey of a wireless network comprising, importing a floor plan image of a building to be surveyed into a portable computer wirelessly coupled to a network server via access points, marking the location of the access points on the imported floor plan image, positioning the portable computer at selected locations within the building, marking the locations of the portable computer on the imported floor plan image, sending a request signal from the portable computer to the network server via the access point requesting a signal containing packets be created by the network server and sent back to the portable computer while the portable computer is at the then current location marked on the imported floor plan image, receiving the request signal at the network server via the access points, generating the packet requests, sending the packet requests multicast to the portable computer, computing the packet error rate and throughput and displaying the quality of signal strength based on the packet rate and throughput on a two-dimensional vector map imposed over the imported floor plan image.

A method of providing a site survey comprising, importing a floor plan image of an area to be surveyed into a client that is wirelessly coupled to a server via access points, marking the location of the access points on the floor image map, positioning the client at various locations within the area to be surveyed, marking the various locations of the client on the floor plan image, receiving packet signals with the client from the server at each of the various locations, calculating at least one of throughput and packet error rate for each of the various locations and displaying the quality of the signal based on the at least one of throughput and packet error rate on a two-dimensional vector map imposed over the floor plan image.

A computer-readable medium including instructions for implementing a method comprising, importing a floor plan image of an area to be surveyed into a client that is wirelessly coupled to a server via access points, marking the location of the access points on the floor image map, positioning the client at various locations within the area to be surveyed, marking the various locations of the client on the floor plan image, receiving packet signals with the client from the server at each of the various locations, calculating at least one of throughput and packet error rate for each of the various locations and displaying the quality of the signal based on the at least one of throughput and packet error rate on a two-dimensional vector map imposed over the floor plan image.

Another computer-readable medium including instructions for implementing a method comprising, receiving a command to generate a test signal of data packets with a network server, generating a test signal in response to the command, wherein the test signal contains a desired amount of packets, further wherein each packet has a defined number of bits, sending the requested data packets in the test signal at predefined time intervals to a client.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a tool for conducting a site survey of network coverage to guide the user in the placement of access points. The results of the survey are displayed in a two-dimensional (2D) vector surface area map using a parametric graph. Data is collected through a user datagram protocol (UDP)/Internet protocol (IP) socket based management protocol. This protocol collects empirical data on throughput and packet error rate. Moreover, embodiments of the present invention transmit data from all access points coupled to a wired network at the same time, advantageously exposing the tool to potential co-channel interference.

The management protocol has two parts, a client application and a server application. The client application tells the server, through the management protocol, how many packets to transmit, packet size, and destination IP address. This can be set to unicast or multicast depending on what type of data the client would like transmitted. The client gathers this data through the management protocol and formats it according to the throughput quality parametric scale the user has set. This data may then be displayed in a two-dimensional vector graphics manner, using a three color parametric graph to discriminate quality.

The wireless network site survey tool according to one embodiment of the present invention provides a hardware independent tool (for both client and access point) that works on IEEE 802.11 equipment (e.g., Intersil PRISM, CISCO Aironet, DLINK Wireless, Linksys 802.11). Moreover, embodiments of the present invention may also integrate with a program like Vision2000 to provide ease of constructing building layout. Further, embodiments of the present invention measure and display the co-channel and adjacent channel interferers (adjacent access points on the same and different channels) to provide cell and multi cell results. Two-dimensional arrays for access point placement in multi-level structures may also be provided. Additionally, Layer 4 management protocol (riding on transport control protocol (TCP)/IP and UDP/IP) may be included for ease of configuration, use and data collection.

Figure 1:
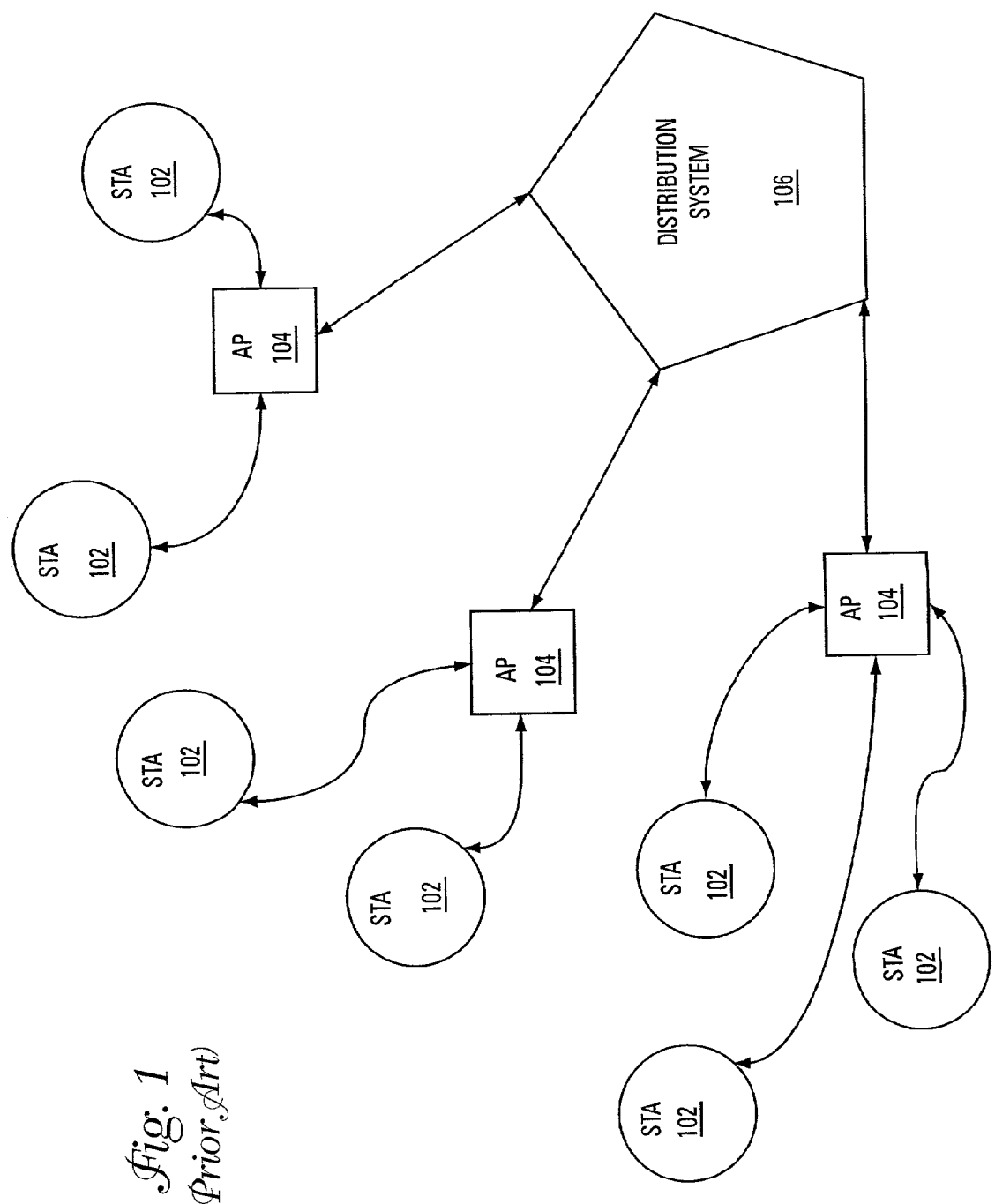
FIG. 1 is a block diagram of a wireless network system of the prior art

A wireless LAN network that implements the IEEE 802.11 technology standard of the prior art is shown in FIG. 1. As shown, a distribution system 106 is coupled to a plurality of access points 104. In one embodiment, the distribution system is an Ethernet network. A plurality of stations (STA) 102 each communicate with an associated access point 104 for transferring data. Typically, each STA 102 communicates with its associated access point by radio wave propagation. Although, the present invention has been described as using the IEEE 802.11 standard protocol and IEEE 802.11 technology, it will be understood in the art that any packet based wireless networking protocol and equipment could be used and that the present invention is not limited to systems using the IEEE 802.11 standard protocol and equipment.

Figure 2:
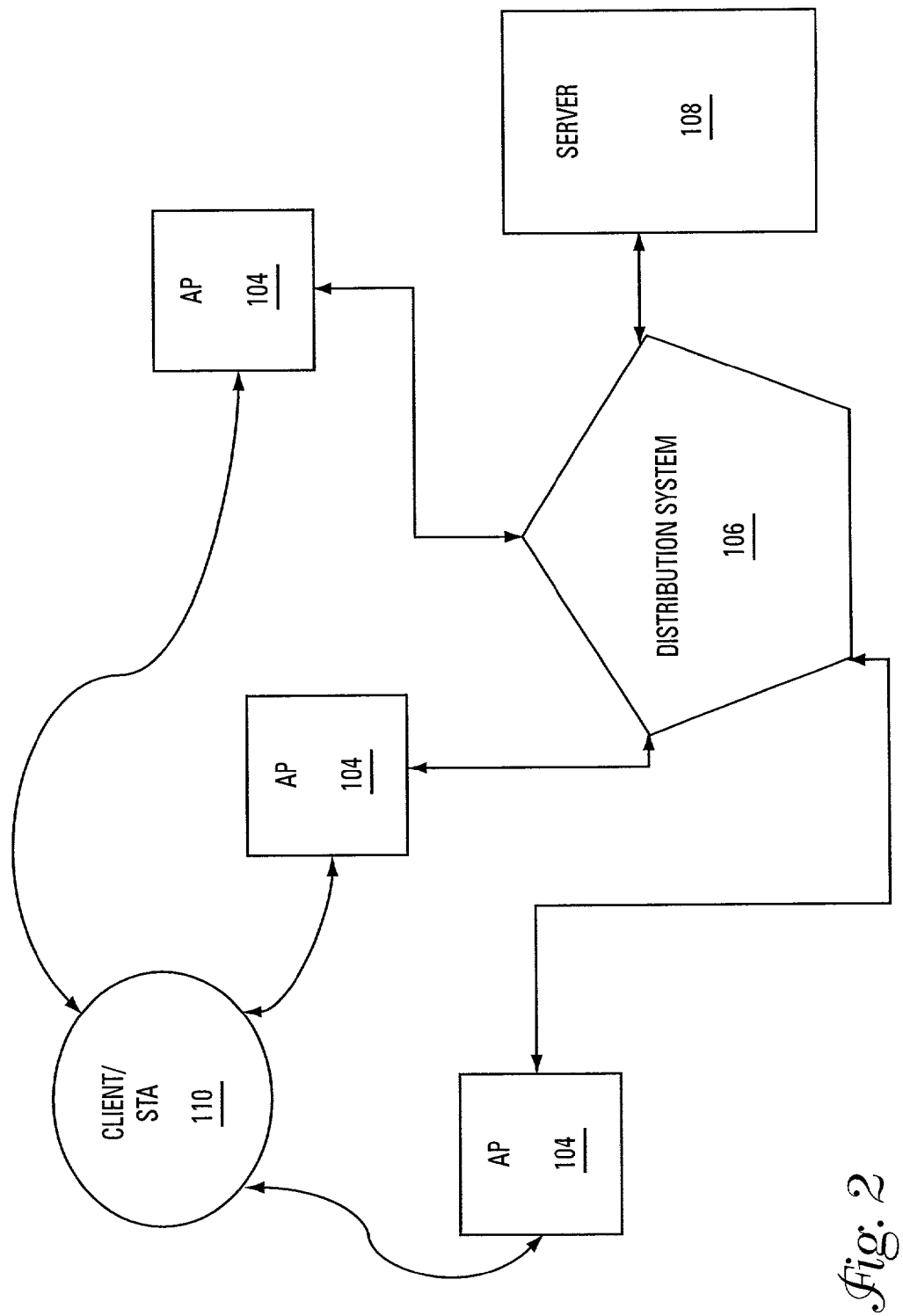
FIG. 2 is a block diagram of software modules according to one embodiment of the present invention.

Referring to FIG. 2, a block diagram illustrating one embodiment of the present invention is shown. As shown, the distribution system 106 is coupled to a server 108. The server 108 provides a packet based signal to the distribution system 106. The distribution system 106 is coupled to the APs 104. In addition, a mobile client or station (client/STA) 110 is wirelessly coupled to the distribution system 106 to send and receive signals throughout the area being surveyed. In one embodiment, the client/STA 110 is a portable computer. Moreover, as shown in FIG. 2, in one embodiment, the wireless signals sent to the client/STA 110 are multicast, through each AP 104 to expose co-channel interference.

Figure 3:
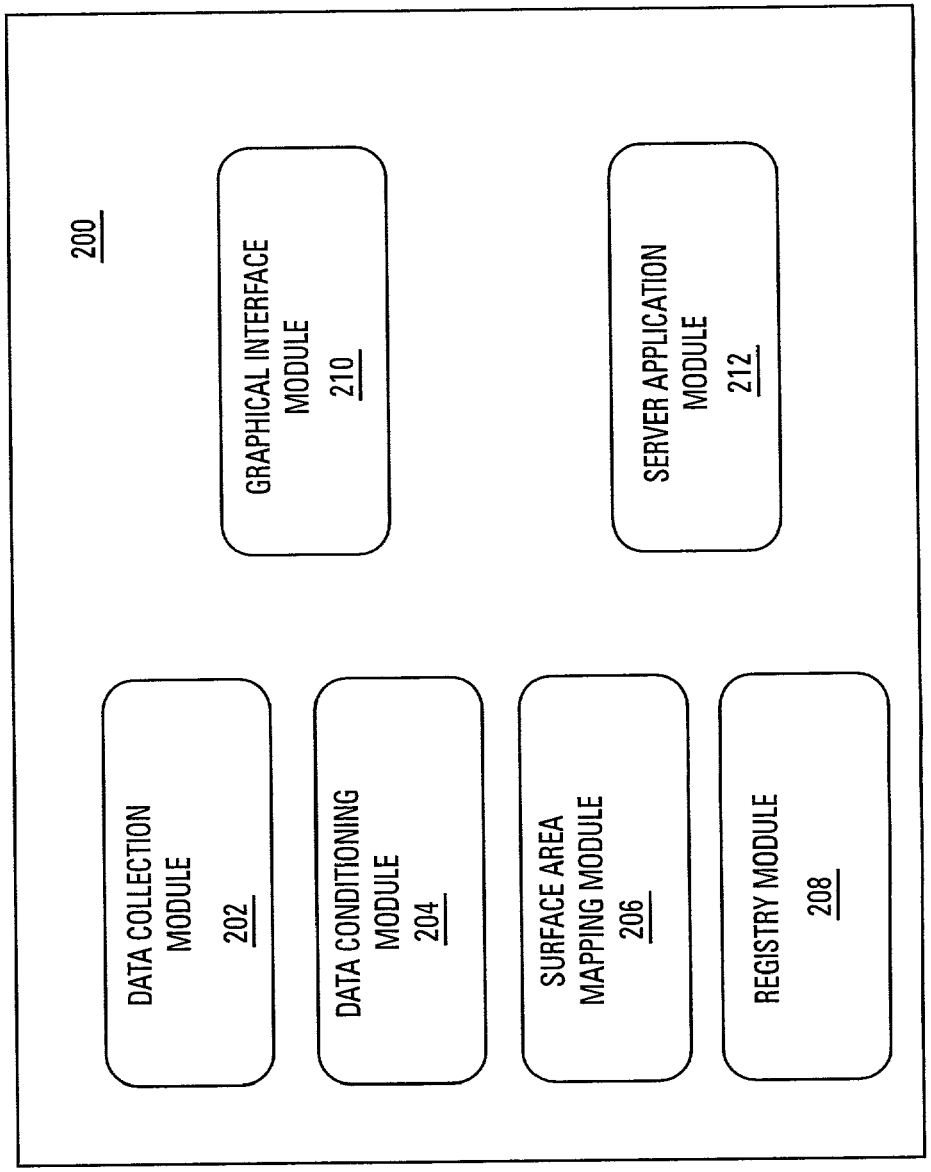
FIG. 3 is a flow chart illustrating the operation of one embodiment of the present invention.

FIG. 3 is an illustration of software modules 200 for a site survey tool according to an embodiment of the present invention. The first module is a data collection module 202. The data collection module 202 is used to collect data between the client 102 and its associated access point 104. The data collection module 202 is hardware independent and collects throughput in Mbps from the server 106. In addition the data collection module 202, collects the packet error rate (PER) from the server 106. The data collection is event driven and typically should take less than 2 seconds to collect. The data collection module 202 implements user data protocol (UDP) (broadcast or unicast). For example, the data collected could have a throughput of 2.23 Mbps, a PER of 12% and the packets received could be 998.

The next module is the data conditioning module 204. The data conditioning module 204 is used to place relative data points on a data grid, to interpolate and extrapolate data, and to set parametric limits on the data. The data conditioning module 204 interpolates data between known data points up to one grid and extrapolates data to up to one grid. The data conditioning module 204 positions relative data points to the nearest grid intersection. The data conditioning module 204 also applies a parametric qualification to the data using a user defined minimum and maximum.

A surface area mapping module 206 takes data from the data conditioning module and maps it to a 2D surface area map on the data grid. This surface area map module 206 further calculates, using the data parametric used for data conditioning, the positioning of lines of different colors on the surface area map to reflect the throughput by regions of the surface area map. The number of lines per grid and the number of grids are user definable with a user interface (UI).

A registry module 208 is used to save to and read from a windows registry. More specifically, the registry module 208 is used to store all changeable and management variables (VARS) to the windows registry. In one embodiment, the register module 208 takes all of the user options and server VARS and stores them in a registry key that uses identifiable names. An example of an identifiable name is PSS\parameters\server_IP=132.158.87.99. The registry is updated upon an APPLY/OK or exit command. Moreover, when the application is started the registry is read and the global and public application variables are populated with the stored settings.

A graphical interface module 210 is used to communicate with and link the aforementioned modules 202, 204, 206 and 208. The graphical interface module 210 is also responsible for open, save, new and print calls. In one embodiment, the graphical interface module 210 includes iconic markers used for the data points. These data points can be clicked from a tool bar and dropped on the surface area map thereby leaving an iconic marker representing the relative location. An access point locator is also selected from a tool bar and dropped on the surface area map by clicking the icon then clicking the surface area map. A data point can also be collected at the access point location using the same method.

After the data point of an access point is dropped on the surface area map or floor plan, the data collection module 202 is called to collect the data. The data is then conditioned by the data conditioning module 204 and sent to the surface area mapping module 206. The data is then displayed on a graphical user interface (GUI). The GUI has an import feature for a floor plan image in .bmp, .gif, .jpg and .tif files. This image will allow relative data points to be collected.

In one embodiment, the GUI has a save feature that saves all of the data, the relative locations, the access point locations and other user defined settings to a file named .psp (main file with data points and relative locations), a file named .psa (character delimited access points file), and a file named .psf (copy of the original floor plan graphics file). In another embodiment, these files are loaded from a load feature restoring the application state to the previous state.

The GUI remembers the last floor plan loaded and the last project and provides them in a drop down list. The parametric maximum and minimum for the throughput can be changed with a key that is hidden and displayed from a drop down list. An advanced screen is used for other GUI parameters such as grid size, grid increment, grid line size, surface area line size, etc. The GUI has a tool bar that contains an open icon, a save icon, a print icon, a data icon, an AP icon, an advanced configuration icon and a help icon. In one embodiment the tool bar is located proximate the top of the GUI. The GUI also has a status bar that indicates the then current status of the test. The status bar also has a clock. In one embodiment, the status bar is located at the bottom of the GUI. The GUI further has standard drop down menus for all the program features. Moreover, there should be an advanced networking form displaying the current test in real time and allowing the user to set the number of packets sent, the packet size, the server IP address, the destination IP address as well as an Apply/OK/Hide control.

Lastly, a server application 212 is responsible for handling requests from clients and sending data packets of the requested sized and number. The server application 212 is also responsible for putting packet sequence numbers into a body of a frame for sniffing and debug reasons. The server application 212 runs and is installed separately from a client module. The server application module 212 launches as a tool tray icon with no GUI. In one embodiment, the GUI can be displayed by double clicking on the tool tray icon or right clicking and selecting maximize. The GUI should display the number of packets sent, the client IP address, packets retransmitted and a Hide/Exit control. In one embodiment, a drop down menu is used to provide these options. The server application module 212 will service any client request regardless of IP as long as the request is formatted appropriately. For example, the server application module may monitor PORT 10262 for incoming requests formatted as:

UDP:Number-Of-Packets_To_Send@Packet_Size&Destination_IP a. Protocol, i.e. UDP or TCP separator [:].
b. Number_of_Packets, i.e. 100 separator [@].
c. Packet size, i.e. 1472 separator [&].
d. Destination IP address, i.e. 255.255.255.255 OR Your_IP-Address.

In addition the mechanics of the client application protocol are the inverse of the server application. Thus, for example, the client application may transmit on PORT 10263 when the user initiates a data collection event. The data transmit request in this example could be formatted as:

UPD:Number_Of_Packets_To_Send@Packet_size&Destination_ a. Protocol, i.e. UDP or TCP separator [:].
b. Number_Of_Packets, i.e. 100 separator [@].
c. Packet size, i.e. 1472 separator [&].
d. Destination IP address, i.e. 255.255.255.255 OR Your_IP_Address.

Figure 4:
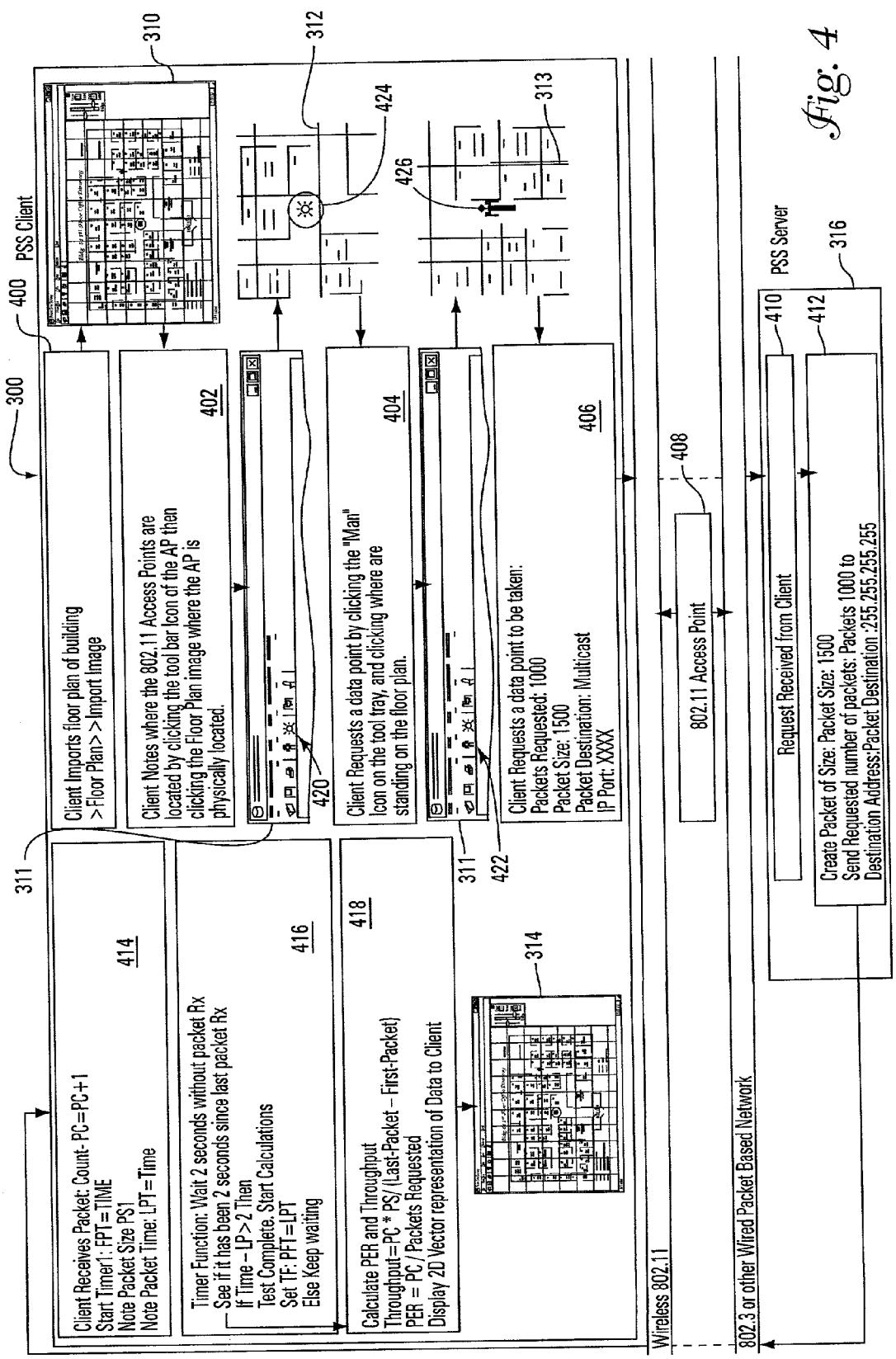
FIG. 4 is a screen shot of a graphic user interface (GUI) showing a representive floor plan according to one embodiment of the present invention.
Figure 5:
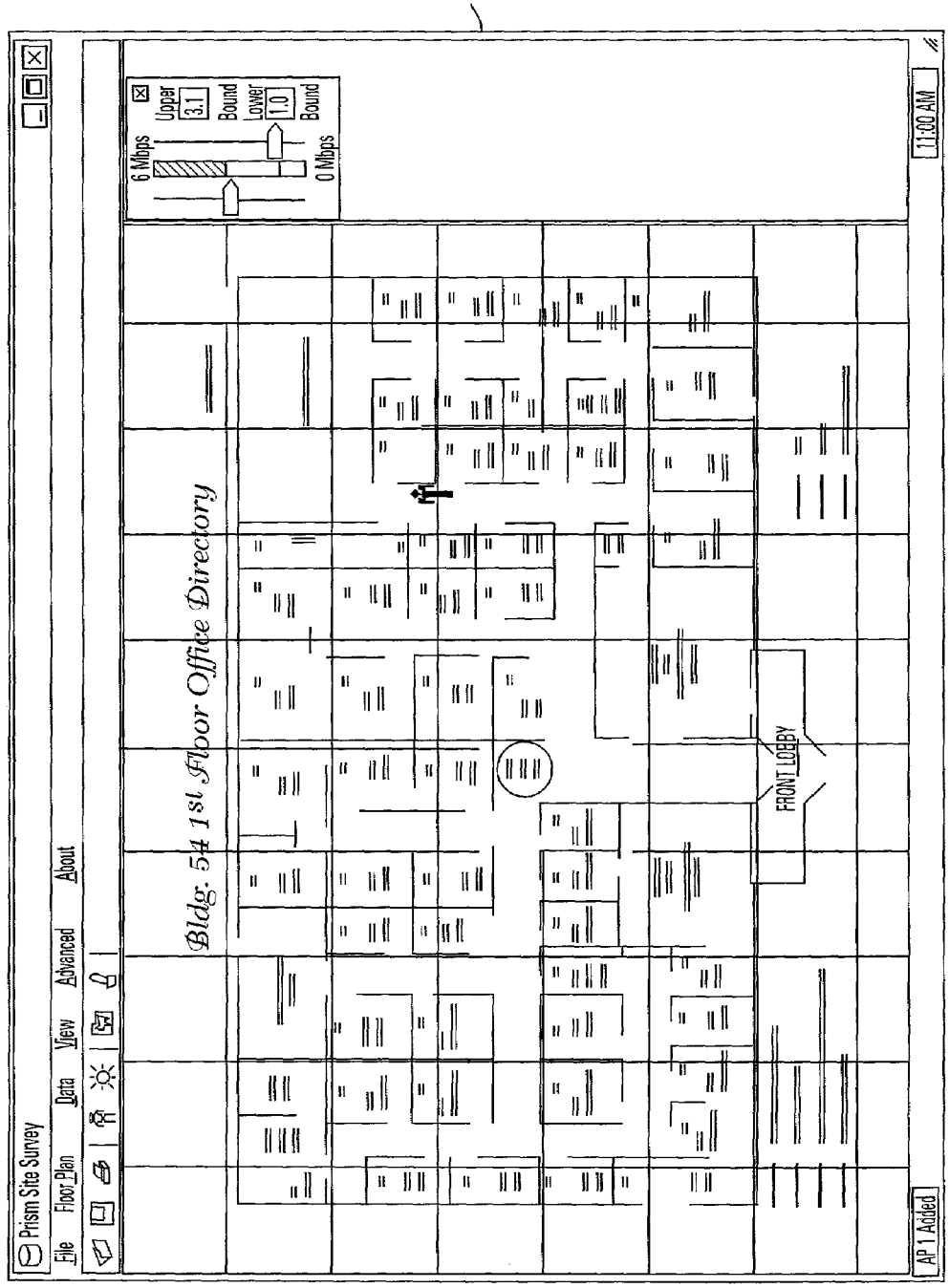
FIG. 5 is a screen shot of a GUI showing a tool bar of one embodiment of the present invention.
Figure 6:
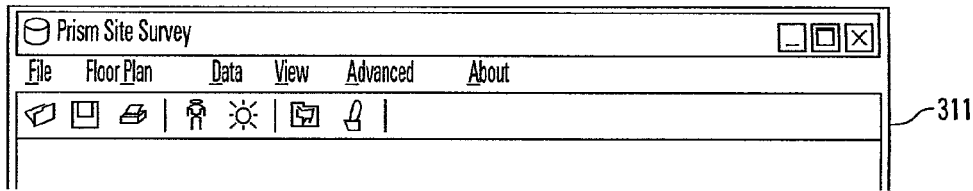
FIG. 6 is a screen shot of a GUI showing a representative floor plan having an access point dropped therein according to one embodiment of the present invention.
Figure 7:
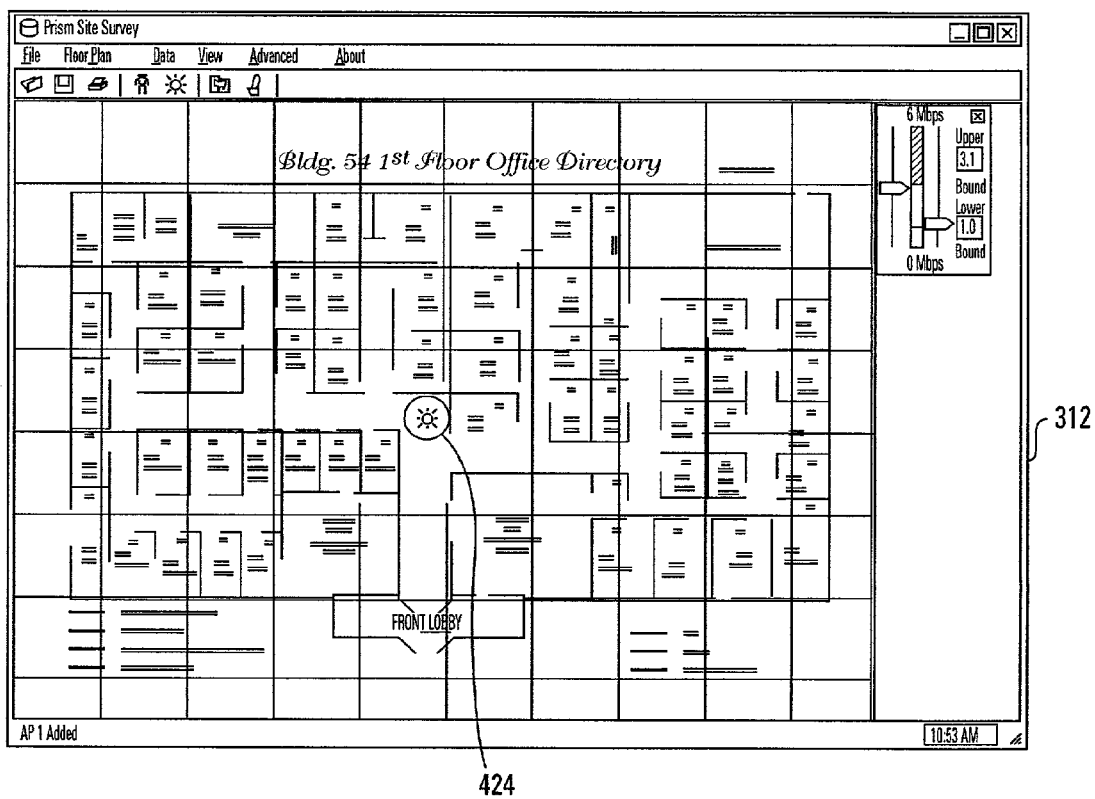
FIG. 7 is a screen shot of a GUI showing portion of a representative floor plan having a data point dropped therein according to one embodiment of the present invention.
Figure 8:
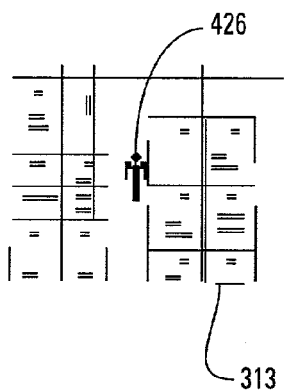
FIG. 8 is a screen shot of a GUI showing a representative floor plan incorporating a site survey according to one embodiment of the present invention.

Referring to FIG. 4 an illustration how the present invention is implemented is shown. The client imports a floor plan image 310 of a building (400). An example of an imported floor plan image 310 is shown in FIG. 5. The client then marks where the access points (AP) are located by clicking on the AP icon 420 on the tool bar 311 and then clicking the floor plan image 310 where the AP is physically located (402). The AP icon 420 is illustrated in tool bar 311 of FIG. 4. Another example of a tool bar 311 is illustrated in FIG. 6. Moreover, an example of a floor plan image 312 having an AP 424 inserted is shown in FIG. 7. Referring back to FIG. 4, the client sets a data point by physically placing the client/STA (portable computer) at a desired location within the building to be surveyed and clicking the "man" icon 422 on the tool bar 311 and then clicking where they are physically located in the floor plan image 310 (404). The "man" icon 422 is illustrated in the tool bar 311 of FIG. 4. An illustration of the data point 426 inserted in a floor plan image 313 is shown in FIG. 8.

Referring back to FIG. 4, the client also sets the parameters of the packets it wants sent to it from a server 316 (405). This information is sent to the server 316 each time a data point is set. For example, as shown, the parameters could be: 1. packets requested: 1000, 2. packet size: 1500, 3. packet destination:multicast and 4. IP port:XXXX. The data is then transferred to an associated access point via the IEEE 802.11 wireless standard (408). The request is then received from the client at the server 316 (410). The server 316 is coupled to the access point 408 using the IEEE 802.3 standard or other wired packet base network standard. The server then creates the requested packets using the parameters sent by the client. The server then sends the requested packets to the access point and back to the client via the 802.11 wireless standard protocol (408).

The client receives packet (414). At (414) the packet number received is counted, each packet size is determined and the time it takes to send the packets is tracked. A timer function is then implemented (416). The packets are traveling at a relatively fast speed, typically in the order of every millisecond. Therefore, all packets should be sent within one second. In one embodiment, the timer function monitors when the packets are received to determine when 2 seconds have past since the last packet (LP) has been received. If time LP>2 the test is complete. If time-LP<2 the timer function keeps waiting.

The PER and throughput are then calculated (418). The throughput equals the number of packets received (PC) times the bit size (PS) of the packets divided the time it took to send the data (fast-packet−first packet). Therefore, throughput=PC*PS/(Last-packet−First-Packet). PER=PC/Packets Requested. A 2D Vector display of data is then displayed over the floor plan image 314.

Figure 9:
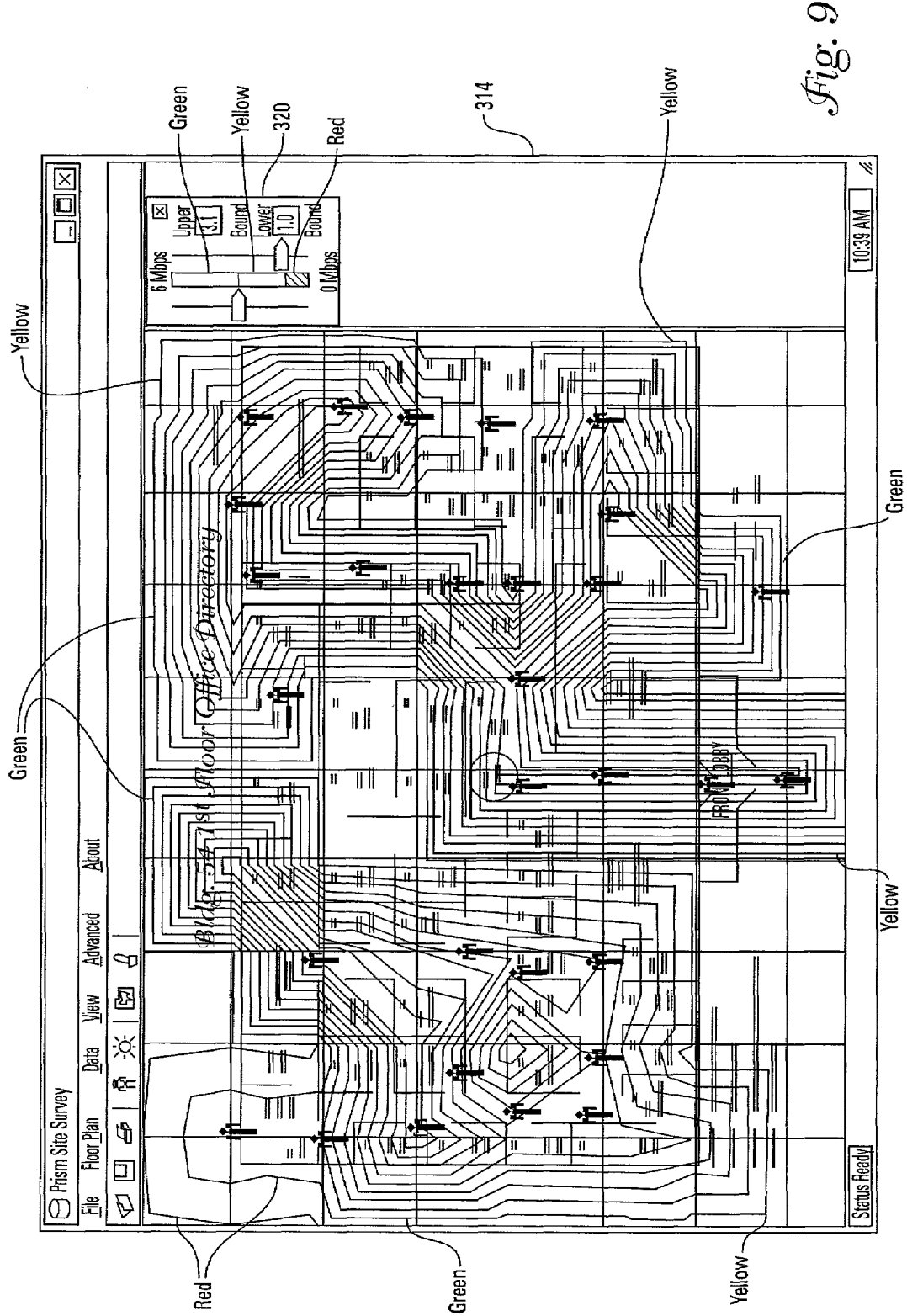
FIG. 9 is a graph illustrating a floor plan image a 2D vector data.

An example of the floor plan image having the 2D Vector data is illustrated in FIG. 9. As shown, a parametric graph illustrates how the wireless network throughput is quantified on the floor image. By implementing a parametric graph using three different colors only an upper limit and a lower limit are defined. A first color, is used for anything above the upper limit. As second color is used for anything below the lower limit and a third color is used for anything in between the upper and lower limit. As marked in FIG. 8, in one embodiment, a red color is used for anything above the upper limit, a green color for anything below a lower limit and a yellow for anything in between the upper and lower limit. The upper and lower limits for throughput are shown at control 320. As shown, in this illustration, 1.0 Mbps is set as the lower limit. Any value under 1.0 Mbps indicates areas where the throughput is unacceptable. The upper limit is set at 3.1 Mbps. Any value over 3.1 Mbps indicates areas where the access points don't need to be so close together. Values that fall within the upper and lower limits indicate area were you do not need to add or take away access points. The values of the upper and lower limits can be changed to accommodate specific system requirements.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A tool for providing a site survey of a wireless network comprising:
   a network server having a server application module to create and distribute data packets;
   a plurality of physical access points located in a network coverage area coupled to send and receive data packets from the server;
   a portable computer in wireless communication with the plurality of access points, the portable computer having a two-dimensional surface area map of the network coverage area on a data grid; and
   wherein the portable computer receives data packets sent by the network server and includes instructions that are adapted to compute at least one of throughput and packet error rate at selected locations within the network coverage area and display the at least one of throughput and packet error rate on the two-dimensional surface area map to provide a site survey depicting a quality of wireless network coverage within the network coverage area.

2. The tool for providing a site survey of a wireless network of claim 1 further comprising:
   a distribution system to coupled signals between the access points and the network server.

3. The tool for providing a site survey of a wireless network of claim 1 wherein the server distributes the data packets to all of the access points simultaneously thereby exposing co-channel interference.

4. The tool for providing a site survey of a wireless network of claim 1 wherein the data grid has a user definable grid size, grid increment, grid line size and a surface area line size.

5. The tool for providing a site survey of a wireless network of claim 1 wherein the two-dimensional surface are map displays the site survey with lines using empirical data.

6. The tool for providing a site survey of a wireless network of claim 1 wherein the portable computer further comprises:
   a data collection module to collect data sent from the access points and to calculate throughput and packet error rate;
   a data conditioning module to place relative data points locations on the data grid, to interpolate and extrapolate data and to set parametric limits on the data;
   a surface mapping module to map the data from the data conditioning module to the two-dimensional surface map; and
   a graphical interface module to communicate with and link the data collection module the data conditioning module, the surface mapping module and a registry module.

7. The tool for providing a site survey of a wireless network of claim 6 wherein the data collection module is hardware independent.

8. The tool for providing a site survey of a wireless network of claim 6 wherein the data conditioning module limits data to a user defined parametric minimum and maximum.

9. The tool for providing a site survey of a wireless network of claim 8 wherein the surface area mapping module uses the data parametric minimum and maximum of the data conditioning module to calculate the positioning of lines of different colors on the surface area map to convey wireless network coverage of a particular area.

10. The tool for providing a site survey of a wireless network of claim 9 wherein the surface area map uses three different colors to distinguish the quality of wireless network coverage.

11. The tool for providing a site survey of a wireless network of claim 6 wherein the graphical interface module further comprises:
iconic markers to indicate data points.

12. The tool for providing a site survey of a wireless network of claim 11 wherein the data points are dropped onto the surface area map to indicate the locations where the portable computer receives the data packets sent by the network server.

13. The tool for providing a site survey of a wireless network of claim 11 wherein the data points mark the location of the access points.

14. A tool for providing a site survey of a wireless network comprising:
a network server to create and distribute data packets;
a plurality of physical access points located in a network coverage area coupled to receive the data packets from the server;
a mobile client in wireless communication with the plurality of access points, the client having a two-dimensional surface area map of the network coverage area on a data grid; and
wherein the client includes instructions that are adapted to compute at least one of throughput and packet error rate at selected locations within the network coverage area when the client receives data packets sent by the network server and display the at least one of throughput and packet error rate on the two-dimensional surface area map to provide a site survey depicting quality of wireless network coverage within the network coverage area.

15. The tool for providing a site survey of a wireless network of claim 14 wherein the server distributes the data packets to all of the access points simultaneously thereby exposing co-channel interference.

16. The tool for providing a site survey of a wireless network of claim 14 wherein the data grid has a user definable grid size, grid increment, grid line size and a surface area line size.

17. The tool for providing a site survey of a wireless network of claim 14 wherein the two-dimensional surface area map displays the site survey with lines using empirical data.

18. The tool for providing a site survey of a wireless network of claim 14 wherein the client sends a request to the network server to create and distribute the data packets.

19. The tool for providing a site survey of a wireless network of claim 14 wherein the client further comprises:
a data collection module to collect data sent from the access points and to calculate throughput and packet error rate;
a data conditioning module to place relative data points locations on the data grid, to interpolate and extrapolate data and to set parametric limits on the data;
a surface mapping module to map the data from the data conditioning module to the two-dimensional surface map; and
a graphical interface module to communicate with and link the data collection module the data conditioning module, the surface mapping module and the registry module.

20. The tool for providing a site survey of a wireless network of claim 19 wherein the client further comprises:
a registry module to save to and read from a window registry.

21. The tool for providing a site survey of a wireless network of claim 19 wherein the data collection module is hardware independent.

22. The tool for providing a site survey of a wireless network of claim 19 wherein the data conditioning module limits data to a user defined parametric minimum and maximum.

23. The tool for providing a site survey of a wireless network of claim 22 wherein the surface area mapping module uses the data parametric minimum and maximum of the data conditioning module to calculate the positioning of lines of different colors on the surface area map to convey wireless network coverage of a particular area.

24. The tool for providing a site survey of a wireless network of claim 23 wherein the surface area map uses three different colors to distinguish the quality of wireless network coverage.

25. The tool for providing a site survey of a wireless network of claim 19 wherein the graphical interface module further comprises:
iconic markers to indicate data points.

26. The tool for providing a site survey of a wireless network of claim 25 wherein the data points are dropped onto the surface area map to indicate the locations where the client receives the data packets sent by the server.

27. The tool for providing a site survey of a wireless network of claim 25 wherein the data points mark the location of the access points.

28. A method of providing a site survey of a wireless network comprising:
sending data packets through a network coverage area of the wireless network to a server;
collecting data on the data packet transmission from two or more physical locations within the network coverage area with a mobile client device;
calculating throughput and error rate at the two or more physical locations; and
implementing the throughput and error rate into a two-dimensional vector surface area map to convey a graphical representation depicting a quality of wireless network coverage within the network coverage area on the mobile client device.

29. The method of claim 28 wherein a three color parametric scale is used to discriminate the quality of network coverage in the graphical representation of the wireless network coverage.

30. The method of claim 28 further comprising:
importing a floor plain image to a screen of a computer of an area to be surveyed; and
displaying the graphical representation of the wireless network coverage on the floor plan image.

31. The method of claim 28 wherein the sending of data packets through the wireless network further comprises:
placing access points at various positions within an area to be surveyed;
generating requests for a specific number of packets containing a specific number of bits with a portable computer selectively positioned at various areas throughout the building being surveyed;
sending the requests to a network server via the access points;
generating the requested number of packets with the requested number of bits with the network server;
sending the requested number of packets with the requested number of bits to the portable computer via the access points; and
wherein the portable computer receives the requested number of packets at the location the portable computer generated the request.

32. The method of claim 31 wherein the requested packets are sent multicast through all of the access points to expose co-channel interference.

33. The method of claim 31 wherein a program in the portable computer calculates throughput and packet error rate.

34. A method of providing a site survey of a wireless network comprising:
importing a floor plan image of a building to be surveyed into a portable computer wirelessly coupled to a network server via wireless access points located at specific physical locations in the building;
marking the location of the access points on the imported floor plan image;
positioning the portable computer at selected locations within the building;
marking the locations of the portable computer on the imported floor plan image;
sending a request signal from the portable computer to the network server via the access point requesting a signal containing packets be created by the network server and sent back to the portable computer while the portable computer is at the then current location marked on the imported floor plan image;
receiving the request signal at the network server via the access points;
generating the packet requests;
sending the packet requests multicast to the portable computer;
computing the packet error rate and throughput; and
displaying a quality of computed signal strength based on the packet rate and throughput on a two-dimensional vector map imposed over the imported floor plan image.

35. The method of claim 34 further comprising:
applying a parametric qualification on the data to display the quality of signal strength.

36. The method of claim 35 wherein applying the parametric qualification on the data further comprises
using lines of a first color to indicate areas having a signal strength higher than a user defined upper limit;
using lines of a second color to indicate areas having a signal strength below a user defined lower limit; and
using lines of a third color to indicate signal strength between the upper and lower limits.

37. The method of claim 34 wherein the more request signals sent by the portable computer at different locations the more detailed the site survey.

38. A method of providing a site survey comprising:
importing a floor plan image of an area to be surveyed into a client that is wirelessly coupled to a server via a plurality of access points located at specific physical locations in the area to be surveyed;
marking the location of the plurality of access points on the floor image map;
positioning the client at various locations within the area to be surveyed;
marking the various locations of the client on the floor plan image;
receiving packet signals with the client from the server at each of the various locations;
calculating at least one of throughput and packet error rate for each of the various locations; and
displaying a quality of calculated signal strength based on the at least one of throughput and packet error rate on a two-dimensional vector map imposed over the floor plan image.

39. The method of claim 38 wherein the client generates a request to the server to send the packet signal back to the client when a location of the client is marked on the floor plan image.

40. The method of claim 38 further comprising:
applying a parametric qualification to data calculated from the at least one of throughput and error rate in displaying the quality of signal on the two-dimensional vector map.

41. The method of claim 40 wherein applying the parametric qualification on the data further comprises:
using a first color to indicate areas having the at least one of throughput and error rate higher than a user defined upper limit;
using a second color to indicate areas having the at least one throughput and error rate less than a user defined lower limit; and
using a third color to indicate areas having the at least one throughput and error rate less between the user defined upper and lower limits.

42. The method of claim 41 wherein the first, second and third colors are displayed as lines on the two-dimensional vector map.

43. A computer-readable medium including instructions for implementing a method comprising:
importing a floor plan image of an area to be surveyed into a client that is wirelessly coupled to a server via a plurality of wireless access points;
marking the location of the plurality of wireless access points on the floor image map;
marking various locations of the client on the floor plan image;
receiving packet signals with the client from the server at each of the various locations;
calculating at least one of throughput and packet error rate for each of the various locations; and
displaying a quality of calculated signal strength based on the at least one of throughput and packet error rate on a two-dimensional vector map imposed over the floor plan image.

44. The computer-readable medium including instructions for implementing a method of claim 43 further including:
generating a request command to send a packet signal with a client; and
transmitting the request to the server.

45. The computer-readable medium including instructions for implementing a method of claim 43 further comprising:
applying a parametric qualification to data calculated from the at least one of throughput and error rate in displaying the quality of signal on the two-dimensional vector map.

46. The computer-readable medium including instructions for implementing a method of claim 45 wherein applying the parametric qualification on the data further comprises:
using a first color to indicate areas having the at least one of throughput and error rate higher than a user defined upper limit;
using a second color to indicate areas having the at least one throughput and error rate less than a user defined lower limit; and
using a third color to indicate areas having the at least one throughput and error rate less between the user defined upper and lower limits.

47. The computer-readable medium including instructions for implementing a method of claim 46 wherein the first, second and third colors are displayed as lines on the two-dimensional vector map.

* * * * *